United States Patent [19]
Klein

[11] 3,897,302
[45] July 29, 1975

[54] MELTABLE PLUG RADIATION SWITCH

[75] Inventor: Joseph R. Klein, Bethpage, N.Y.

[73] Assignee: The United States of America as represented by the Secretary of the Air Force, Washington, D.C.

[22] Filed: Aug. 12, 1969

[21] Appl. No.: 851,149

Related U.S. Application Data

[63] Continuation-in-part of Ser. No. 747,780, July 22, 1968, abandoned.

[52] U.S. Cl.............. 176/86 M; 176/22; 176/10; 337/407; 250/390
[51] Int. Cl.............................................. G21c 7/10
[58] Field of Search............. 176/22, 86, DIG. 5; 337/401–407, 416

[56] References Cited
UNITED STATES PATENTS
1,981,484  11/1934  Werring ............................ 337/403

Primary Examiner—Maynard R. Wilbur
Assistant Examiner—N. Moskowitz
Attorney, Agent, or Firm—Joseph E. Rusz; Jacob N. Erlich

[57] ABSTRACT

A meltable plug radiation switch having a meltable uranium alloy plug which forces the ends of a snap ring apart and into contact with a pair of spring clip contacts to complete a circuit. Through exposure to radiation, the plug melts, thereby allowing the snap ring ends to come together breaking the circuit.

5 Claims, 3 Drawing Figures

PATENTED JUL 29 1975　　　3,897,302

INVENTOR.
JOSEPH R. KLEIN
BY Harry A. Herbert Jr
Jacob N. Erlich and
ATTORNEYS

MELTABLE PLUG RADIATION SWITCH

BACKGROUND OF THE INVENTION

This application is a continuation-in-part of application Ser. No. 747,780 filed July 22, 1968 and now abandoned.

This invention relates generally to a switch for actuating a device when the neutron exposure exceeds a predetermined threshold level and, more particularly, to a switch which will activate a device such as a signaling device on a power plant when the neutron exposure exceeds the predetermined threshold level, thereby preventing damage to the power plant which would normally occur due to such excessive neutron exposure.

In our development of nuclear power plants it is desirable to construct a plant which will meet all the required safety criteria. Thus, it becomes essential to control the operation of such a plant when the neutron exposure exceeds a predetermined level. Such a control can be accomplished by, for example, the removal of the moderator such as water, of the power plant or the reinsertion of the control or safety rods. Furthermore, it is necessary in many instances for an additional signal to be generated under the high neutron condition in order to protect personnel.

It has heretofore been a major problem to develop a switch which will prevent damage to any sensitive apparatus, such as a power plant, by determining when the order of magnitude of such incident neutron radiation is beyond a predetermined safe level and thereby actuating the safety devices or signaling means associated with such a power plant.

It has also been a problem to develop a switch which will detonate the warhead of a re-entry vehicle or any other such device when the order of magnitude of incident neutron radiation is between the melting and vaporization levels and thereby salvage some of the value of, for example, the weapon. Such a reduced yield produced by the salvaging operation may still have useful ground damage effects. In other words, it has been concluded that if a full-scale detonation of the offensive weapon cannot be achieved, a partial yield is preferable to no yield at all.

A further problem encountered in the radiation switch development is that the premature operation of the switch must be very small. This includes the unnecessary activation of the switch in the face of less then lethal environment, due to the inaccuracy of the switch. If the switch thresholds and activates at a level substantially less than that at which the power plant will be damaged, the reliability of the power plant has essentially been lowered to that of the level of the switch. Furthermore, the switch must be able to survive a nonlethal encounter just prior to a lethal one.

SUMMARY OF THE INVENTION

The switch of the instant invention overcomes all of the above-mentioned problems. The instant radiation switch will perform any kind of suitable switching operation as in a power plant in the manner set forth hereinabove or detonate the warhead of a ballistic re-entry vehicle when the neutron exposure exceeds a predetermined damage threshold, thereby preventing destruction or damage to the device to which it is attached.

The function of the instant invention is to sense the existence of neutron radiation of sufficient intensity and spectrum and to activate, for example, the safety devices or signaling means attached to a power plant.

The radiation switch of the instant invention causes a circuit to be either opened or closed when a predetermined nuclear flux density is encountered. This is caused by the melting of a meltable uranium alloy plug which in turn allows a spring to actuate. The heat required to melt the plug comes from the fission of the uranium alloy. Thus, by properly "salting" the alloyed plug, a particular flux density will melt the alloy, thereby either opening or closing a circuit at a predetermined time. As hereinbefore disclosed, the instant invention finds its utility as a safety switch in a power plant in order to switch a circuit to protect the operation of the components.

It is therefore an object of this invention to provide a radiation switch which will be activated when the neutron exposure reaches its predetermined threshold.

It is a further object of this invention to provide a radiation switch whose percentage of failure is at a minimum.

It is still another object of this invention to provide a radiation switch which will survive a non-lethal encounter just prior to a lethal one.

It is still a further object of this invention to provide a radiation switch which is economical to produce and which utilizes conventional, currently available components that lend themselves to standard mass production manufacturing techniques.

For a better understanding of the present invention, together with other and further objects thereof, reference is had to the following description taken in connection with the accompanying drawing, and its scope will be pointed out in the appended claims.

DESCRIPTION OF THE PREFERRED EMBODIMENT

Figure 2:
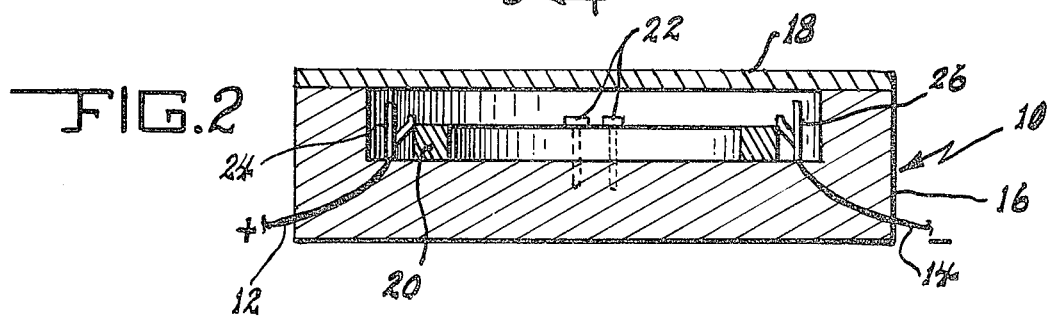
FIG. 2 is a cross section view taken along line 2—2 of FIG. 1 with the top in position.
Figure 3:
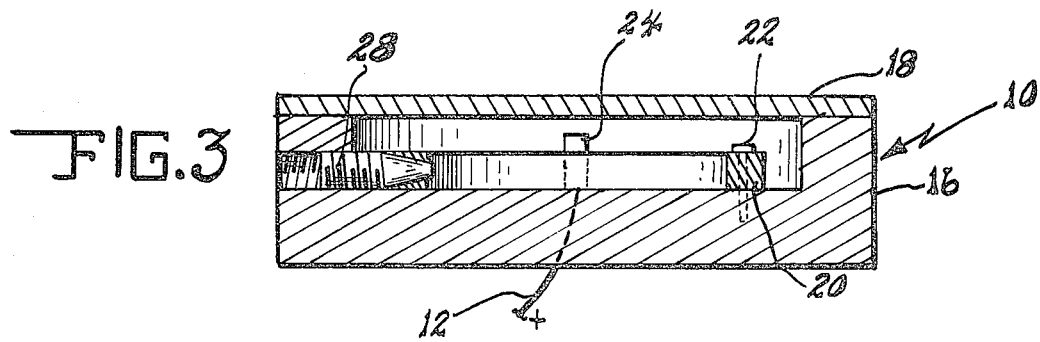
FIG. 3 is a cross section view taken along line 3—3 of FIG. 1 with the top in position.

Reference is now made to FIGS. 2 and 3 of the drawing wherein the radiation switch 10 of the instant invention is shown to be operatively connected by a circuit, part of which is made up of wires 12 and 14, and to any device (not shown) which is to be activated when the neutron exposure exceeds a predetermined damage threshold. Such a device may be in the form of a safety device within a power plant and the switch 10 of the instant invention may be located anywhere therein that does not interfere with the performance of other components.

The switch 10 is made up of a case 16 manufactured from any suitable material and having a cover 18 removably secured thereto by any conventional securing means (not shown). Located within the case 16 is a spring-like device such as snap ring 20 made of any suitable conductive material. The snap ring 20 may be of any suitable configuration or design such as an annular split ring as shown in the drawing (see FIG. 1). The snap ring 20 is fixedly secured to the case 16 by any suitable fastening means such as rivets 22.

The wires 12 and 14 of the circuit are fixedly secured to a pair of spring clip contacts 24 and 26, respectively. A meltable plug 28 made of any suitable material such as uranium alloys of cobalt, manganese or nickel is inserted by any suitable inserting method into the case 16 (see FIGS. 1 and 3). The plug 28 is located with the case 16 in such a position as to enter the split portion of snap ring 20, forcing the ring apart and into engagement with spring contacts 24 and 26 completing the circuit.

Figure 1:
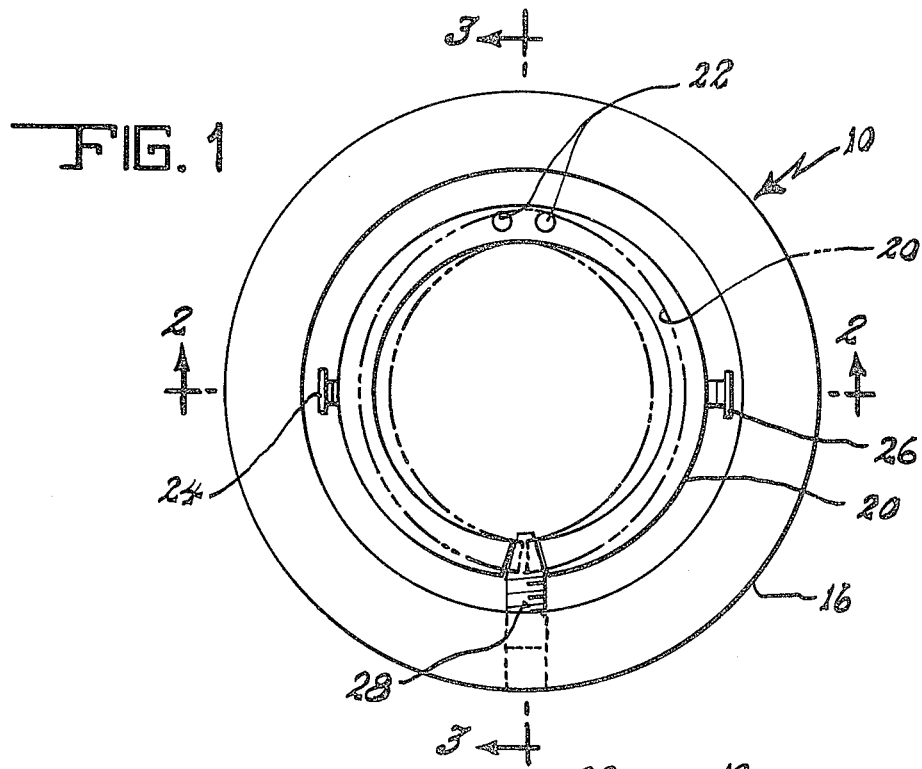
FIG. 1 represents a plan view of the switch of this invention with the top removed.

Referring now to FIG. 1 of the drawing, it can be seen that the snap ring 20 engages the spring contacts 24 and 26 when the plug is in place forming a complete circuit, and disengages (phantom lines) the spring contacts 24 and 26 when the plug 28 is removed (or has melted).

Although the spring contacts are shown as being located adjacent the outer surface of the split ring 20, the spring contacts 24 and 26 may be located adjacent the inner surface of the split ring 20. In the case wherein the spring contacts are located adjacent the inner surface of split ring 20, the ring would be out of contact with the contacts when the plug 28 is in place and engages the contacts 24 and 26 when the plug is removed or has melted.

MODE OF OPERATION

Referring now to the drawing, it can be seen that in the inoperative position the snap ring 20 engages the spring contacts 24 and 26 forming a complete circuit, i.e., in the inoperative position the meltable plug 28 is in place.

Upon subjection of the switch 10 to an environment wherein the neutron exposure exceeds a predetermined damage threshold established by the meltable plug alloy composition, the plug 28 of switch 10 melts allowing the snap ring 20 to snap to its original position (shown in phantom in FIG. 1) wherein the ring does not touch the contacts and thereby breaks the circuit. The breaking of the circuit in turn activates any device attached thereto.

Although the invention has been described with reference to a particular embodiment, it will be understood to those skilled in the art that the invention is capable of a variety of alternative embodiments within the spirit and scope of the invention.

What is claimed is:

1. A meltable plug radiation switch comprising a case, a spring in the form of an annular split ring fixedly secured to said case, a pair of contacts located adjacent said spring, said spring being biased into contact with said pair of contacts by a meltable plug, whereby melting of said plug allows said spring to move out of contact with said pair of contacts.

2. A meltable plug radiation switch as defined in claim 1 wherein said meltable plug is made of a uranium alloy.

3. A meltable plug radiation switch as defined in claim 2 wherein said meltable plug is a uranium alloy of cobalt.

4. A meltable plug radiation switch as defined in claim 2 wherein said meltable plug is a uranium alloy of manganese.

5. A meltable plug radiation switch as defined in claim 2 wherein said meltable plug is a uranium alloy of nickel.

* * * * *